United States Patent [19]

Minor et al.

[11] 4,344,406
[45] Aug. 17, 1982

[54] FUEL SAVER

[75] Inventors: Robert N. Minor, Stafford Springs, Conn.; Edward J. F. Cloutier, Sturbridge, Mass.

[73] Assignee: Gasaver Corp., New Britain, Conn.

[21] Appl. No.: 167,860

[22] Filed: Jul. 22, 1980

Related U.S. Application Data

[63] Continuation-in-part of Ser. No. 62,521, Aug. 2, 1979, abandoned.

[51] Int. Cl.³ ............................................. F02M 23/08
[52] U.S. Cl. ..................................... 123/587; 123/327
[58] Field of Search ................................. 123/587, 327

[56] References Cited

U.S. PATENT DOCUMENTS

| | | | |
|---|---|---|---|
| 1,083,789 | 1/1914 | Alexanderson | 123/587 |
| 1,240,303 | 9/1917 | Brasier | 123/587 |
| 2,749,895 | 6/1956 | Flint | 123/587 |
| 3,575,386 | 4/1971 | Boyd | 123/587 |
| 3,585,976 | 6/1971 | Rider | 123/587 |
| 3,590,793 | 7/1971 | Masaki | 123/587 |
| 3,659,575 | 5/1972 | Lekka | 123/587 |
| 3,677,237 | 7/1972 | Hansen | 123/587 |
| 3,799,132 | 3/1974 | MacGuire | 123/587 |
| 3,809,035 | 5/1974 | Winton | 123/587 |
| 3,977,372 | 8/1976 | Fernandez | 123/587 |

*Primary Examiner*—Tony M. Argenbright
*Attorney, Agent, or Firm*—St. Onge, Steward, Johnston & Reens

[57] ABSTRACT

Devices are shown and described for attachment to an engine's intake manifold to regulate its vacuum for fuel economy. The device maintains smooth engine operation by employing multiple valves, each of which provides a supplemental flow of air to the intake manifold during a particular engine mode. Thus, during an idle mode one individually settable valve is operative to supply additional air to the intake manifold to maintain its vacuum at a precisely selected level referenced to an engine idle mode while during deceleration, when a high volume of air is needed, a supplemental flow of air is admitted from another valve which opens at a higher vacuum level from the first valve. A third valve is employed to admit supplemental air during acceleration when the other two valves are closed for an improved fuel to air mixture. Several embodiments are shown.

25 Claims, 9 Drawing Figures

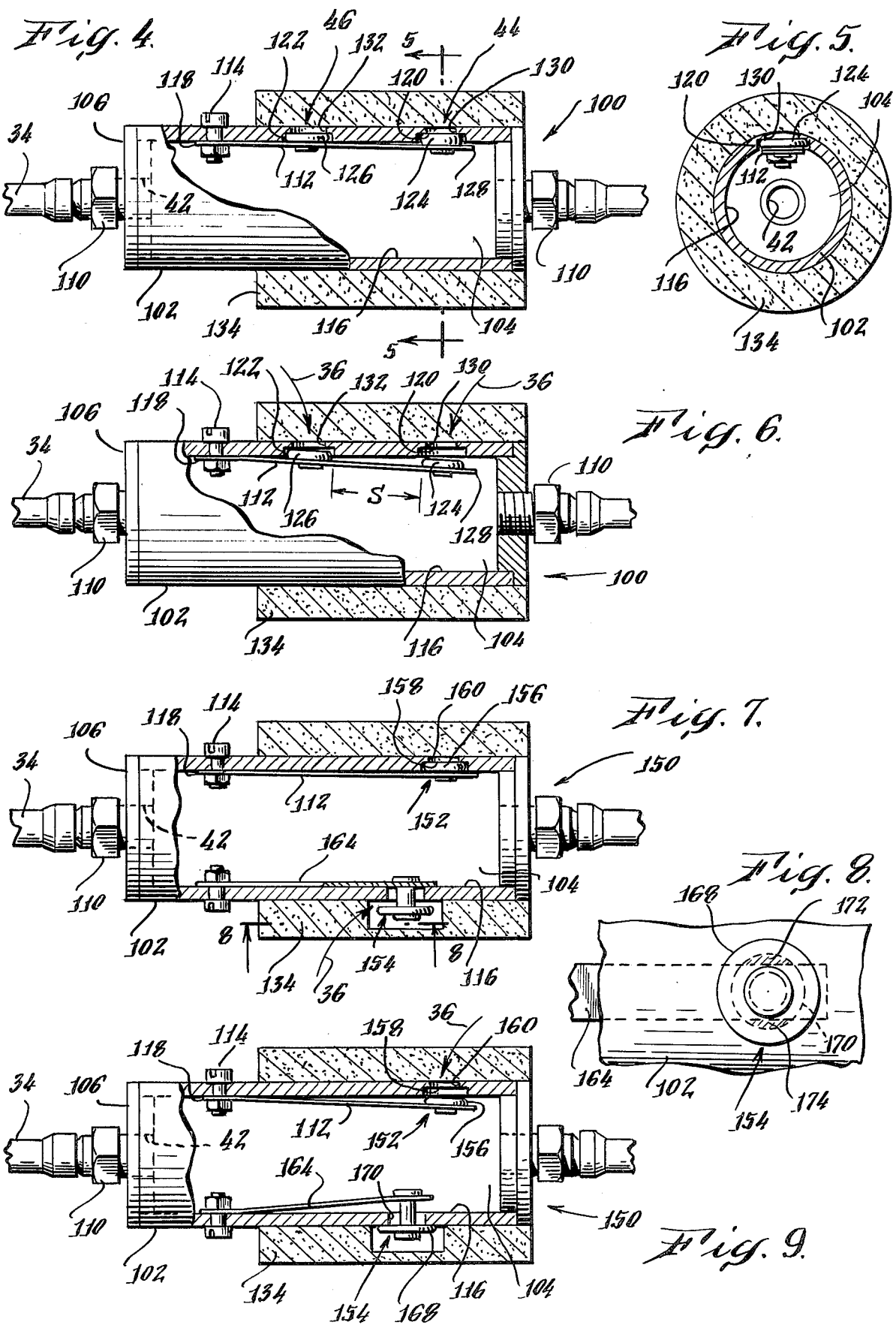

FUEL SAVER

PRIOR APPLICATION

This application is a continuation-in-part of patent application Ser. No. 062,521 filed Aug. 2, 1979, now abandoned.

FIELD OF THE INVENTION

This invention relates to a device for reducing fuel consumption in an internal combustion engine. More specifically, this invention relates to a device for reducing fuel consumption in an automobile engine by automatically controlling the vacuum level inside the intake manifold of the engine during selected operating modes.

BACKGROUND OF THE INVENTION

It is well known that internal combustion engines have operating modes during which a high level of pollutants and unburned fuel are emitted. Such conditions may arise during idle, deceleration and acceleration modes of the engines.

Techniques have been proposed to improve an engine's fuel utilization and reduce the exhaust of pollutants by controlling the intake manifold pressure by supplying additional air to the intake manifold during idling, or deceleration of the engine.

Examples of such prior art techniques can be found in U.S. Pat. No. 3,659,575 to Lekka for use during engine idling or U.S. Pat. No. 3,977,372 to Fernandez during engine deceleration. Other patents describing devices for regulating intake manifold pressure to control fuel burning and exhaust of pollutants are U.S. Pat. No. 3,590,793 to Masaki; U.S. Pat. No. 3,575,386 to Boyd; U.S. Pat. No. 2,749,895 to Flint; U.S. Pat. No. 3,677,237 to Hansen; and U.S. Pat. No. 3,809,035 to Winton. Of particular interest are the U.S. Pat. No. 3,799,132 to MacGuire and U.S. Pat. No. 3,585,976 to Rider.

These prior art devices provide intake manifold pressure regulation during specific operating modes, but do not combine different fuel saving techniques applicable to different engine operating modes in a single structure.

SUMMARY OF THE INVENTION

With a fuel saver for reducing fuel consumption in a reciprocating internal combustion engine in accordance with the invention, a plurality of normally closed valves are provided in a housing to regulate the fuel mixture at the intake manifold for the engine throughout a specific range of engine operating modes. In one device in accordance with the invention for improving fuel economy for an internal combustion engine, a housing, which is conveniently mountable to a vacuum line leading to the intake manifold of the engine, is provided with at least first and second control valves. The first control valve, a normally closed valve, provides a first supplemental air source to the intake manifold during a first engine mode when the vacuum in the intake manifold exceeds a predetermined upper limit of the vacuum range characteristic for this first engine mode. The second valve, a normally open valve, provides a supplemental air source to the intake manifold during a second engine mode when the vacuum in the intake manifold drops below a predetermined lower limit of the vacuum range characteristic for the second engine mode.

As further described herein, fuel economies are obtained by opening the first and second control valves respectively during an engine mode when manifold vacuum levels tend to rise above a predetermined upper limit of an idle engine mode and during an acceleration mode when the vacuum level tends to drop below a lower limit.

As further described with reference to one fuel saver in accordance with the invention, a pair of individually settable valves admit supplemental air at different predetermined intake manifold vacuum levels. A first valve is constructed and arranged to admit a flow of air to limit engine intake manifold vacuum below a predetermined vacuum level for an idle engine mode without affecting cruising speed vacuum levels. The second valve is constructed and arranged to admit a supplemental flow of air during an engine deceleration mode to provide, in cooperation with the first valve, a sufficient flow of air to avoid a significantly higher vacuum level at the intake manifold than this predetermined idle mode vacuum level. The second valve is thus set to open at a second intake manifold vacuum level which is slightly higher than the predetermined vacuum level at which the first valve opens. In this manner different air flow requirements needed for a smooth operation of the engine are achieved as it is run through its various operating modes.

In a described form for a fuel saver in accordance with the invention, three control valves are mounted in a common housing. A first individually settable valve is constructed and arranged to be normally biased closed and is set to open at a predetermined vacuum level referenced to the vacuum developed at a control port of the housing during a fast engine idle mode. This predetermined idle vacuum level is selected so that the first valve opens during an engine mode having a higher vacuum level such as deceleration. A second individually settable valve in the housing is so constructed and arranged that it is normally closed whenever the first valve is open. The second valve is set to open when the vacuum level at the control port tends to rise above the predetermined vacuum level above which the first valve opens. A third control valve is constructed and arranged to admit additional air when the vacuum at the control port drops below a lower limit occurring during an engine acceleration mode. With these control valves, greater fuel economy is achieved over a wide range of engine operating modes.

With a fuel saver in accordance with the invention, engine fuel consumption and carbon monoxide emission from the engine exhaust can be reduced during various operating regimes. City driving, when engine idling and frequent acceleration and deceleration modes are a major factor in high fuel consumption, can be made more efficient. Fuel consumption during open highway driving may also be significantly reduced by taking advantage of reduced engine vacuum on down hill slopes. Less fuel consumption may also be achieved on up hill slopes when the engine is put in an acceleration mode to maintain vehicle speed.

Fuel economy has been discovered to be particularly enhanced by selecting the predetermined vacuum level when the first control valve starts to admit supplemental air, to be within a particular range referenced to a vacuum level for an engine idle mode. For example, as further described herein, the first control valve is set to open when the vacuum level achieves a predetermined upper limit within a range extending from about five to about fifteen percent of the vacuum level occuring during a fast engine idle mode.

With a fuel saver in accordance with the invention, smooth transitions between operational modes of the engine are obtained even though control limits for engine vacuum levels are established for fuel economy. Improved engine power is obtained by enabling more optimized fuel mixtures such as during rapid acceleration. When lower octane fuels are used, a fuel saver of this invention appears to reduce valve pinging effects.

A fuel saver of this invention is conveniently installed in a vacuum hose connected to the manifold without a need for special fittings or engine modifications. The fuel saver is advantageously adjustable to work with different engines.

It is thus an object of the invention to provide a fuel saver for an internal combustion engine whereby significant fuel savings can be obtained.

These and other advantages and objects of the invention can be understood from the following description of several embodiments described in conjunction with the drawings.

BRIEF DESCRIPTION OF DRAWINGS

FIG. 4 is a side view partially in section of another form for a fuel saver in accordance with the invention;

FIG. 5 is a section view of the fuel saver shown in FIG. 4 and taken along the line 5—5 thereon;

FIG. 6 is a side view, partially in section, of the fuel saver shown in FIG. 5 but for a different operational mode;

FIG. 7 is a side view in partial section of another form for a fuel saver in accordance with the invention;

FIG. 8 is an enlarged section of a portion of the fuel saver shown in FIG. 7 and taken along the line 8—8 thereon;

FIG. 9 is a side view in partial section of the fuel saver shown in FIG. 7, but for a different operational mode.

DETAILED DESCRIPTION OF EMBODIMENTS

Figure 1:
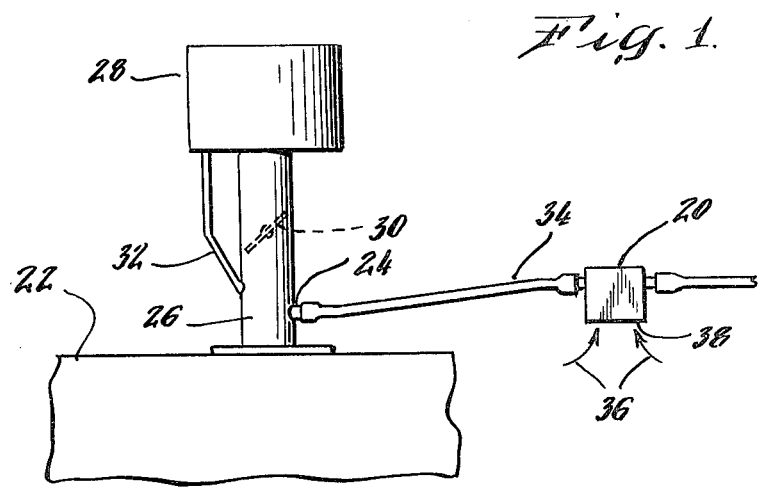
FIG. 1 is a side elevation and schematic representation of an engine placement of a fuel saver in accordance with the invention.
Figure 2:
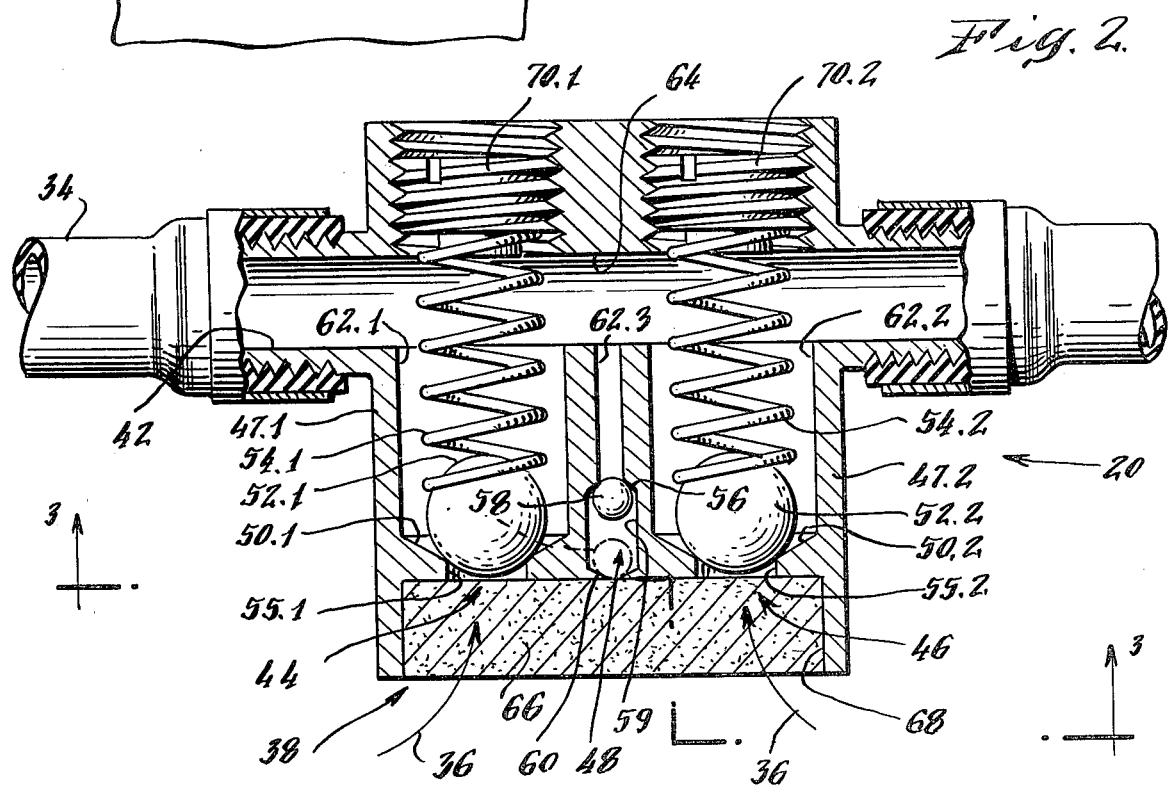
FIG. 2 is a side section view of a fuel saver in accordance with the invention.
Figure 3:
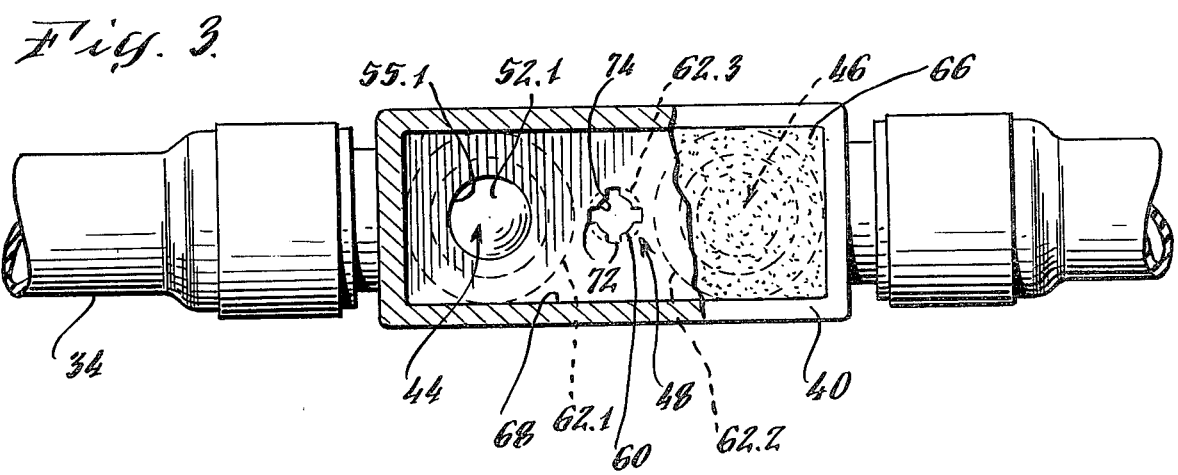
FIG. 3 is a side section view of the fuel saver of FIG. 2 taken along the line 3—3 thereon.

With reference to FIGS. 1–3, a fuel saver 20 in accordance with the invention is illustrated. The fuel saver is shown in FIG. 1 in communication with an intake manifold 22 of an internal combustion engine used in a vehicle (not shown). The fuel saver is shown connected at 24 to a conduit 26 leading from a conventional carburetor 28 to the intake manifold 22. The connection at 24 is located downstream of a throttle valve 30 and idle fuel jets 32 so that the intake manifold vacuum may be regulated. The operation and structural features of the carburator 28, throttle valve 30 and idle fuel jets 32 are well known and need not be described in further detail.

The fuel saver 20 may be mounted directly to conduit 26 or as shown in FIG. 1 inserted in a vacuum hose 34 leading from the connection at 24 to a convenient mounting place. The fuel saver 20 may be inserted in a vacuum hose 34, which is pneumatically coupled to intake manifold 22 and may be used to drive other components of the vehicle.

The fuel saver 20 operates to admit ambient air, as suggested by arrows 36, in a controlled manner from an air inlet 38 to the intake manifold 22. The fuel saver 20 is formed with a rectangular housing 40 having a control port 42 which is adapted to receive hose 34 as shown or may be directly connected to the intake manifold 22.

Housing 40, which may be formed of an integrally plastic molded unit, is provided with three side by side located valves 44, 46 and 48 which are interposed between air inlet 38 and control port 42. Valves 44 and 46 are located adjacent housing side walls 47.1, 47.2 and are each formed with a valve seat 50 (such as 50.1 and 50.2) and a valve element 52 (such as 52.1 and 52.2) in the form of a ball and a spring 54 (such as 54.1 and 54.2) to normally seat balls 52.1 and 52.2 respectively on valve seats 50.1 and 50.2 and close off valve openings 55.1 and 55.2. Valves 44 and 46 are thus normally biased closed.

The third valve 48, centrally located between housing side walls 47.1, 47.2, is formed with a valve seat 56 onto which a valve element 58 seats to close valve 48. Valve element 58 is in the form of a ball captured in a valve chamber 59. In the absence of a vacuum at control port 42 when ball 58 is forced against valve seat 56, ball 58 drops onto support 60 to open valve 48.

The valves 44, 46 and 48 are each provided with passageways 62, such as 62.1, 62.2 and 62.3 which are in communication with control port 42 via a control conduit 64 extending from control port 42 to intersect passageways 62. An air filtering material 66 is located in a recess 68 at air inlet 38 of housing 40 to maintain valves 44, 46 and 48 free of particles and dirt.

The embodiment shown in FIG. 1 has an air inlet 38 from which valves 44, 46 and 48 admit ambient air to control port 42. It should be understood, however, that such air inlet may be separately provided for each of the valves. The term air inlet as used herein is intended to include such other or separate air inlets as may be provided for the several valves in a fuel saver in accordance with the invention.

The valves 44, 46 and 48 each are operative during a particular operational mode of the engine. Valve 44 is set to open when the vacuum at the control port 42 is above a predetermined upper vacuum limit set relative to the vacuum developed during an idling mode for the engine. Thus, the force supplied by spring 54.1 is selected by choosing the proper spring or varying the spring force by adjusting a screw spring force selector 70.1, to which spring 54.1 is anchored, towards or away from valve seat 50.1.

The spring force selected for spring 54.1 is such that additional air is admitted to control port 42 if the intake manifold vacuum tends to rise above a predetermined limit. This upper limit has been found to influence the fuel economy which can be obtained with the fuel saver 20. This upper limit is preferably set relative to a vacuum developed by a particular repeatable engine mode. In the case of fuel saver 20, normally closed control valve 44 is set to open at a particular vacuum level below the vacuum developed during a fast idle mode of the engine. Thus, for one engine it was found that the preferred upper vacuum limit above which control valve 44 should open was about one inch of mercury below the vacuum level developed at a fast engine idle mode of about 2000 rpm.

At different upper limits fuel economy may change. For example, when the upper limit was set for a lower vacuum level of say three inches below the vacuum level of the fast engine idle mode, fuel economy suffered instead of improved. Similarly, at higher vacuum levels for the upper limit, fuel economy tended to change.

The vacuum level setting for the opening of valve 44 tends to depend upon different engines. Generally the valve 44 is set to open at an upper vacuum limit which falls in a range from about five to about fifteen percent below the vacuum level developed during a fast engine idle mode. In some instances fuel economy was obtained at a setting of one inch of mercury below the vacuum level of 18 inches of mercury developed during a fast engine idle mode of 2000 rpm. Improvements in fuel economy, such as a higher miles per gallon fuel consumption, were obtained at upper vacuum limits extending from about one to about two and a half inches of mercury below the vacuum level at a fast engine idle of 2000 rpm.

Other considerations in the setting of the vacuum level at which valve 44 opens involve a vacuum level consistent with smooth engine operation so that other engine functions, whose operations depend upon the intake vacuum level such as the engine's spark advance, is not improperly interfered with by the fuel saver 20.

The valve 46 is set to open when the intake manifold tends to be driven into a high vacuum such as may occur during engine deceleration when the air flow through open valve 44 is insufficient to maintain the intake manifold at the vacuum level where valve 44 opens. During such deceleration mode a relatively large volume of air is needed to maintain the intake manifold at a desired vacuum level. Accordingly, valve 46 in cooperation with the already opened valve 44, is selected to open at a higher intake manifold vacuum level than the vacuum level at which valve 44 opens. An intake manifold vacuum level which is several inches of mercury higher than the level at which valve 44 opens was found sufficient for the opening of valve 46.

During a deceleration mode, when the engine tends to form a high vacuum, a large volume of air is needed to limit the vacuum to a level at which fuel is used more efficiently with a low pollutant emission level. The opening of valve 46 advantageously increases the amount of air flowing to control port 42 during deceleration, while allowing both valves 44 and 46 to properly operate. As a result, a smoother air flow and improved vibrational behavior is obtained with fuel saver 20 over a wide range of engine operating modes. Adjustment to select the opening vacuum level for valve 46 can be obtained in a similar manner as for valve 44. Thus, a screw spring force adjuster 70.2 to which spring 54.2 is anchored is mounted in housing 40 for movement toward or away from valve seat 50.2.

With a fuel saver 20, valve 44 opens first followed by valve 46. The valves are so sized such that, when opened, they may vibrate. Such valve element vibration is deemed desirable when accompanied with small valve openings (small displacement of a ball 52 from its seat 50) to improve fuel mixing action at the intake manifold by the pulsating action of the air flow.

Valve 48 is closed whenever the intake manifold has a vacuum above a preset acceleration level. This level is selected so that during engine modes such as startup, idle, cruising and deceleration, valve element 58 is seated on valve seat 56 to close valve 48.

However, when the engine is accelerated and full throttle is applied, the vacuum at control port 42 drops below the preset acceleration level. Valve element 58 then drops onto a central opening 74 in support 60 to open valve 48 as shown in dotted line in FIG. 2. This enables air to pass through slots 72, extending radially from central opening 74 around valve element 58 to control port 42.

The air admitted by the opened valve 48 enters the engine intake manifold 22 below the throttle valve 30. This additional air tends to improve fuel mixture while reducing the fuel drawn from the venturi fuel source normally employed inside the engine carburator 28.

Valve 48 requires an inclined orientation to operate. A vertical orientation is preferred, though this has not been found necessary. The preset acceleration vacuum level below which valve 48 opens is determined by selecting the weight of element 58 and the cross sectional area of the valve seat opening 62.3. On one fuel saver 20 the valve 48 was set to open when the vacuum at control port 42 would drop below a preset acceleration level of about five inches of mercury.

In one example of a fuel saver 20 in accordance with the invention, the dimensions were as follows:

| | |
|---|---|
| valve elements 52.1, 52.2 | 0.500" diameter |
| valve openings 55.1 and 55.2 | 0.375" diameter |
| valve ball element 58 | 0.250" diameter weight of about 1.13 grams |
| valve chamber 59 | 0.281" diameter |
| control port 42 | p.437" diameter. |

The fuel saver was tested in a 3710 lb curb weight 1979 Pontiac Catalina with a six cylinder engine of 3.8 liters. The fuel consumption with the fuel saver was found to yield a fuel economy as high as about 5.8%, i.e. from 14.48 miles per gallon to 15.51 miles per gallon over an intricate test drive course. For this car, this optimum vacuum level at which supplemental air from valve 44 was allowed to flow was at about one-half inch of mercury (about 3 percent) below the 18 inch vacuum level occurring at a fast idle engine mode of 2000 rpm. A 4.9% miles per gallon improvement was obtained at an upper limit of about one inch (about 5%) below the 18 inch fast idle vacuum level.

When the fuel saver 20 was installed in a Buick LeSabre 1974 model having a 455 CID V8 engine in a 4400 lb curb weight model, about a seven percent improvement in fuel economy was obtained at a setting for valve 44 of about 1.5 inches of mercury (about 10%) below a fast idle vacuum level of 1.8 inches. Fuel economy was still obtained as the upper limit for opening of valve 44 was decreased to two and then two and a half inches (about 15%) below the fast idle vacuum level of 18 inches. At higher vacuum levels (generally less than about 5% below the fast engine idle vacuum level) and at lower vacuum levels of below about 15%, no fuel economy was obtained and in fact appeared to result in an increase in fuel consumption. The selection of the vacuum level at which valve 44 would be set to open, thus was found to be critical in obtaining a fuel economy over a broad range of driving conditions. Higher fuel economies may in some cases be obtained.

Installation of fuel saver 20 to an engine in an automobile may be conveniently carried out. Preferably the largest vacuum hose 34 in the engine compartment, such as the vacuum line leading to the power brake system, is severed. The ends such as 43.1 and 43.2 in communication with control port 42 are inserted in the severed line. Clamps (not shown) may be used to firmly affix the vacuum hose to fuel saver ends 43.1 and 43.2.

Setting of valve 44 is obtained by measuring, with a conventional vacuum gauge connected to the hose leading to the intake manifold, the vacuum developed at a fast engine idle speed (from about 1500 to about 2000 rpm). Such idle speed can be quickly determined employing equipment commonly available at a gas station. The fast idle vacuum level as measured by the gauge in inches or centimeters of mercury is recorded at a time when the engine is thoroughly warmed up.

The end 43.1 of the fuel saver 20 is then inserted in the vacuum hose 34 leading to intake manifold 26 and the gauge connected or otherwise permanently coupled to fuel saver end 43.2. The engine speed is again set at the fast idle mode and the spring force selector 70.1 adjusted to register about a 5% (about 1" of mercury) lower reading on the vacuum gauge than what was previously recorded without the fuel saver 20.

The spring force selector 70.2 for valve 46 normally does not require changing since its setting may be factory selected so as to open at a sufficiently higher vacuum than could be expected for valve 44.

When a car engine is tuned, the fuel saver device should be first removed, the vacuum line 34 closed off and reinstalled after tuning.

In the fuel saver 100 illustrated in FIGS. 4, 5 and 6, a housing 102 is provided with a through bore 104. The housing 102 is cylindrical with other shapes being usable. The axial ends of housing 102 are provided with closures 106, 108 which include conduit fittings 110 to which a vacuum hose such as 34 in FIG. 1 can be attached.

In the fuel saver 100, valves such as 44 and 46 are provided, but formed in a different manner. A longitudinal spring 112 such as a leaf spring is attached in cantilever fashion with a suitable fastener 114 inside bore 104. The spring 112 is shown in FIG. 5 in a normally valve closure position whereby spring 112 fits generally parallel with the internal wall 116 of bore 104 in an axial direction.

Opposite spring 112 and at predetermined spacings from the fastened end 118 of spring 112, are first and second valve seats 120, 122 with openings leading to an air inlet. The spring 112 is provided with valve elements 124, 126 located to be normally seated on valve seats 120, 122 under spring bias action from spring 112. The housing 102 is provided with a sleeve 134 formed of a porous filter material to maintain valves 44, 46 free of dirt.

For operation of a fuel saver 100, the spring 112 and the size of valve 44 are selected such that the cantilevered end 128 of spring 112 is forced to flex away from wall 116 to open valve 44 commencing at the desired engine idle vacuum pressure. When a higher vacuum level occurs in bore 104, such as during engine deceleration, spring 112 flexes further away from wall 116 to open valve 46 in addition to valve 44 as illustrated in FIG. 7.

Opening of valves 44, 46 in fuel saver 100 depends upon the surface area of valve openings 130, 132 in wall 116, the spacing S between valve elements 124, 126 and the spring force applied by spring 112. The area of openings 130, 132 need not be the same and are further selected in view of the amount of air to be passed during particular operating modes of the engine with which the fuel saver is intended to operate.

In the embodiment of FIGS. 7-9, a fuel saver 150 is shown with valves 152 and 154. Valve 152 is similar to a valve as shown in FIG. 5 with a leaf spring 112, valve element 156, valve seat 158 and valve opening 160. The sizing of valve 152 is selected in such manner that it serves the function of both valves 44 and 46 in fuel saver 100 of FIG. 5. Alternatively, the latter valves may be used in fuel saver 150.

Valve 154 is an acceleration air supply valve mounted inside bore 104 of housing 102 with a leaf spring 164 anchored at 166. Spring 164 is provided with a valve element 168 which seats over valve opening 170 to close the valve 154. The spring 164 normally biases valve element 168 to open valve 154 as shown in FIG. 7. In such case spring 164 partially covers valve opening 170 leaving side located air passages 172, 174 as shown in FIG. 8.

The small force from spring 164 is selected such that it opens with a small pressure differential as occurs during engine acceleration and closes as soon as the intake manifold pressure drops below a pressure level which is higher than the vacuum pressure needed to start the engine. The functions provided by the embodiment of FIGS. 7-9 may also be achieved by employing the fuel saver of FIG. 2, but with one valve such as 46 deleted or blocked off.

Having thus explained several embodiments in accordance with the invention, its advantages can be appreciated. The fuel saver enables smooth engine operation throughout its operating modes while achieving a significant fuel economy.

What is claimed is:

1. A device responsive to a vacuum in an intake manifold of an internal combustion engine for improving fuel economy by controlling said intake manifold vacuum during a plurality of different engine operating modes, each of which has a characteristic range of vacuum levels, comprising:

a first normally closed control valve adapted when opened to provide a first supplemental air source to said intake manifold during at least a first engine mode;

a second normally open control valve adapted when opened to provide a second supplemental air source to said intake manifold during at least a second engine mode; and means for pneumatically coupling said first and second control valves to said intake manifold;

said first control valve being constructed and arranged to open when the vacuum in said intake manifold exceeds a predetermined upper limit of the characteristic vacuum range for said first engine mode to deliver a controlled quantity of air to said intake manifold thereby reducing the amount of fuel being drawn from a carburetor into said intake manifold during at least said first engine mode;

said second normally open control valve being constructed and arranged to close when the vacuum in said intake manifold exceeds a predetermined lower limit of the characteristic vacuum range for said second engine mode and to open when the vacuum in said intake manifold drops below said predetermined lower limit of the characteristic vacuum range for said second engine mode to deliver a controlled quantity of air to said intake manifold thereby reducing the amount of fuel being drawn from said carburetor into said intake manifold during at least said second engine mode, said predetermined upper limit of the characteristic vacuum range for said first engine mode being greater than said predetermined lower limit of the characteristic vacuum range for said second engine mode to provide a vacuum range wherein both said valves are closed.

2. The device of claim 1 wherein said predetermined upper limit of the characteristic vacuum range for said first engine mode is within a preselected range below a normal vacuum level for said first engine mode.

3. The device of claim 1 wherin said predetermined upper limit of the characteristic vacuum range for said first engine mode is between about 5 to about 15 percent below the vacuum level of an idle engine mode.

4. A device responsive to a vacuum in an intake manifold of an internal combustion engine for improving fuel economy by controlling the intake manifold vacuum during at least an idle engine operating mode and an acceleration engine operating mode, each of which modes has a characteristic range of vacuum levels, comprising:
a first normally closed control valve adapted when opened to provide a first supplemental air source to said intake manifold during at least said idle mode;
a second normally open control valve adapted when opened to provide a second supplemental air source to said intake manifold during at least said acceleration mode; and
means for pneumatically coupling said first and second control valves to said intake manifold;
said first control valve being constructed and arranged to open when the vacuum in said intake manifold exceeds a predetermined upper limit of the characteristic vacuum range for said idle mode to deliver a controlled quantity of air to said intake manifold, thereby reducing the amount of fuel being drawn from a carburetor into said intake manifold during at least said idle mode;
said second normally open control valve being constructed and adapted to close when the vacuum in said intake manifold exceeds a predetermined lower limit of the characteristic vacuum range of said acceleration mode and to open when the vacuum in said intake manifold drops below said predetermined lower limit of the characteristic vacuum range of said acceleration mode to deliver a controlled quantity of air to said intake manifold thereby reducing and optimizing the amount of fuel being drawn from said carburetor into said intake manifold during at least said acceleration mode, said predetermined upper limit of the characteristic vacuum range for said idle mode being greater than said predetermined lower limit of the characteristic vacuum range for said acceleration mode to provide a vacuum range wherein both said valves are closed.

5. A device responsive to a vacuum in an intake manifold of an internal combustion engine for improving fuel economy by controlling said intake manifold vacuum during a plurality of different engine operating modes, each of which has a characteristic range of vacuum levels, comprising:
a first normally closed control valve adapted when opened to provide a first supplemental air source to said intake manifold during at least a first engine mode;
a second normally opened control valve adapted when opened to provide a second supplemental air source to said intake manifold during at least a second engine mode;
a third normally closed valve adapted when opened to provide a third supplemental air source in cooperation with said first supplemental air source to said intake manifold during at least a third engine mode; and
means for pneumatically coupling said first, second and third control valves to said intake manifold;
said first control valve being constructed and arranged to open when the vacuum in said intake manifold exceeds a predetermined upper limit of the characteristic vacuum range for said first engine mode to deliver a controlled quantity of air to said intake manifold thereby reducing the amount of fuel being drawn from a carburetor into said intake manifold during at least a first engine mode;
said second control valve being constructed and arranged to open when the vacuum in said intake manifold drops below a predetermined lower limit of the characteristic vacuum range for said second engine mode to deliver a controlled quantity of air to said intake manifold thereby reducing the amount of fuel being drawn from said carburetor into said intake manifold during at least said second engine mode;
said third control valve being constructed and arranged to open when the vacuum in said intake manifold exceeds a predetermined upper limit of the characteristic vacuum range for said third engine mode to deliver a controlled quantity of air in cooperation with said controlled quantity of air from said first control valve into said intake manifold thereby reducing the amount of fuel being drawn from said carburetor into said intake manifold during at least said third engine mode.

6. The device of claim 5 wherein said predetermined upper limit of the characteristic vacuum range for said first engine mode is greater than said predetermined lower limit of the characteristic vacuum range for said second engine mode and wherein said predetermined upper limit of the characteristic vacuum range for said third engine mode is slightly greater than said predetermined upper limit of the characteristic vacuum range for said first engine mode.

7. The device of claim 6 wherein said predetermined upper limit for said first engine mode is within a preselected range below the normal vacuum level for an engine idle mode.

8. The device of claim 7 wherein said preselected range is about five to about fifteen percent below the vacuum level for a fast idle engine mode.

9. A device responsive to a vacuum in an intake manifold of an internal combustion engine for improving fuel economy by controlling the intake manifold vacuum during at least an idle engine operating mode, an acceleration engine operating mode and a deceleration engine operating mode, each of which modes has a characteristic range of vacuum levels, comprising:
a first normally closed control valve adapted when opened to provide a first supplemental air source to said intake manifold during at least said idle mode;
a second normally opened control valve adapted when opened to provide a second supplemental air source to said intake manifold during at least said acceleration mode;

a third normally closed control valve adapted when opened to provide a third supplemental air source in cooperation with said first supplemental air source to said intake manifold during at least said deceleration mode; and means for pneumatically coupling said first, second and third control valves to said intake manifold;

said first control valve being constructed and arranged to open when the vacuum in said intake manifold exceeds a predetermined upper limit of the characteristic vacuum range for said idle mode to deliver a controlled quantity of air to said intake manifold, thereby reducing the amount of fuel being drawn from a carburetor into said intake manifold during at least said idle mode;

said second control valve being constructed and adapted to open when the vacuum in said intake manifold drops below a predetermined lower limit of the characteristic vacuum range for said acceleration mode to deliver a controlled quantity of air to said intake manifold thereby reducing the amount of fuel being drawn from said carburetor into said intake manifold during at least said acceleration mode;

said third control valve being constructed and adapted to open when the vacuum in said intake manifold exceeds a predetermined limit of the characteristic vacuum for said deceleration mode and which is slightly higher than the predetermined upper limit for said idle mode, to deliver a controlled quantity of air from said first control valve to said intake manifold thereby reducing the amount of fuel being drawn from said carburetor into said intake manifold during at least said deceleration mode.

10. The device of claim 9 wherein said predetermined upper limit of the characteristic vacuum range for said predetermined vacuum range for said idle mode is greater than said predetermined lower limit of the characteristic vacuum range for said acceleration mode and wherein said predetermined upper limit of the characteristic vacuum range for said deceleration mode is greater than said predetermined upper limit of the characteristic vacuum range for said idle mode, with said predetermined upper limit for said idle mode being set in the range of from about five to about fifteen percent below the vacuum level of a fast idle engine mode.

11. A device for reducing fuel consumption of an internal combustion engine having a carburetor from which a mixture of fuel and ambient air is supplied to an intake manifold of the engine comprising:

a housing having a control port adapted for communication with the intake manifold of the engine, and at least first and second normally biased closed valves interposed between the ambient air and the control port to provide supplemental air to said manifold;

said first normally closed valve including individually settable control means responsive to a vacuum level at the control port above a first predetermined vacuum level for opening said first valve during at least an idle mode of the engine to supply supplemental air to the manifold at a flow rate sufficient to maintain said first predetermined vacuum level at the control port during said at least engine idle mode;

said second normally closed valve including individually settable control means for opening said second valve above a second predetermined control port vacuum level, which is selected slightly higher than said first predetermined vacuum level to provide a supplementary supply of air to the control port during engine deceleration when the volume of air flowing through said first valve is insufficient to maintain said first predetermined vacuum level at the control port.

12. The device according to claim 11 wherein said first valve control means is set to open said first valve at a control port vacuum level which is in a predetermined range below the vacuum level of an engine mode.

13. The fuel consumption reducing device according to claim 11 wherein said first valve control means is set to open said first valve at a control port vacuum level which is within the range of about five to about fifteen percent below the vacuum level of a fast idle engine mode.

14. The fuel consumption reducing device according to claim 12 wherein said first valve control means is set to open said first valve at a control port vacuum level which is about one inch of mercury below the vacuum level of said fast idle engine mode.

15. The fuel consumption reducing device according to claim 11 and further including a third valve in said housing and interposed between the ambient air and the control port, said third control valve including means responsive to control port vacuum levels for opening said third valve during an acceleration mode of said engine when the control port vacuum drops below a third predetermined vacuum level and closing said third valve above said third predetermined vacuum level.

16. The fuel consumption reducing device according to claim 15 wherein the means for opening and enabling closure of said third valve further includes a valve element;

an air passageway between the ambient air and the control port, said air passageway having a valve closure seat at one end and a valve opening seat, said valve element being disposed with respect to said air passageway to operatively engage the valve closing seat to close the valve when the vacuum at the control port is above said third predetermined vacuum level and engage the valve opening seat when said control port vacuum is below said third predetermined vacuum level.

17. The fuel consumption reducing device according to claim 16 wherein said third valve element is captured in said air passageway to operatively move between the valve seats, said valve element having a weight and size to engage said valve opening seat when said engine is operated during an acceleration mode and engage said valve closing seat during other operating modes of said engine.

18. The fuel consumption reducing device according to claim 17 wherein said third valve element is in the form of a ball with a weight and size selected to operatively rest upon said valve opening seat when said device is operatively mounted to said engine with a generally vertical orientation for said passageway.

19. The fuel consumption reducing device according to claim 15 wherein said housing is provided with a common air inlet in communication with said valves.

20. The fuel consumption reducing device according to claim 11 wherein said housing is formed of a cylindrical body having a through bore, and wherein said first and second valves are mounted to said body within its through bore.

21. The fuel consumption reducing device according to claim 20 wherein both of said means for opening of said first and second valves includes a cantilever mounted leaf spring attached at one end to said body, a pair of valve openings in said cylindrical body and located opposite said leaf spring at preselected spacings from its one attached end, and valve elements mounted to said leaf spring to normally close said valve openings with spring bias from said leaf spring.

22. A device for reducing fuel consumption of an internal combustion engine having a carburetor from which a mixture of fuel and ambient air is supplied to an intake manifold of the engine comprising
   a housing having a control port adapted for communication with the intake manifold of the engine, first and second passageways located generally parallel to each other within the housing, and a control conduit extending from the control port to intersect said first and second passageways;
   each of said passageways terminating at one end at a valve seat, valve elements located in said passageways, and springs located in said passageways to bias the valve elements against the valve seats, with said housing being provided with externally adjustable spring force selectors located on one side of the control conduit opposite said passageways;
   one of said spring force selectors being adjusted to provide a spring valve closing force on one valve element enabling the unseating of said one valve element when the vacuum level inside said control conduit reaches a first predetermined level corresponding to a high vacuum limit operative for an engine idle mode;
   the other of said spring force selectors being adjusted to provide a spring valve closing force on the other valve element to enable said latter element to unseat from its valve seat and when the vacuum level inside said control conduit rises above said first predetermined level to establish a supplementary flow of air to the control port during an engine deceleration mode.

23. The fuel consumption reducing device according to claim 22 wherein said housing further has a third passageway in communication with said control conduit and terminating at a third valve seat, and a valve chamber in communication with said third passageway, a third valve element captured in said valve chamber,
   said third valve element being of a weight and size such that upon a generally vertical orientation of said third passageway, the third valve element closingly engages the third valve seat when the vacuum level inside the control conduit exceeds a third predetermined level and opens below said latter level to enable a supplemental volume of air during a rapid acceleration of the engine.

24. The fuel consumption reducing device according to claim 22
   wherein said first and second passageways are located adjacent side walls of the housing and said third passageway is located between the first and second passageways.

25. The fuel consumption reducing device according to claim 24 wherein the housing is further provided with a common filter recess sized to communicate with the passageways, and a filter located in said common filter recess.

* * * * *